Sept. 30, 1941. A. E. LILLQUIST 2,257,611
TIMING DEVICE FOR MECHANICAL POWER DRIVES
Filed Aug. 16, 1939
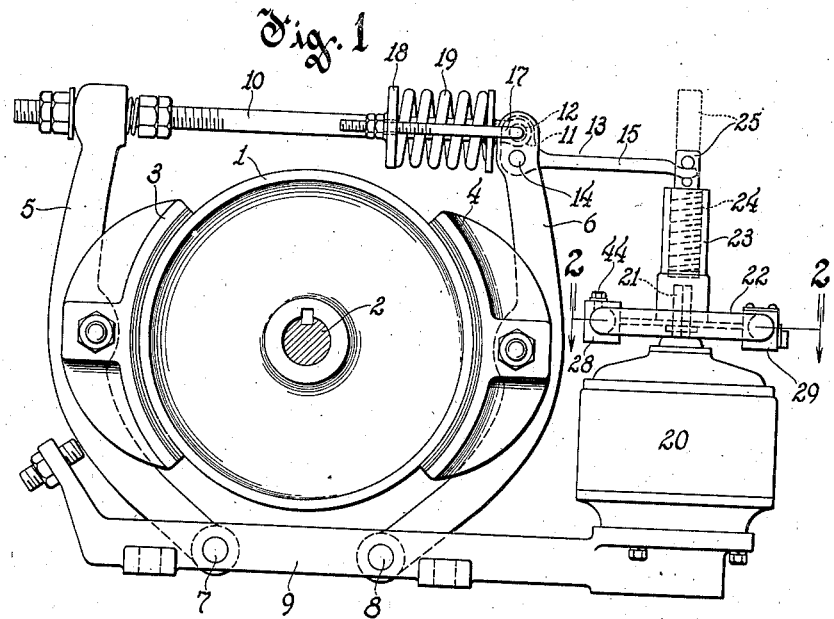
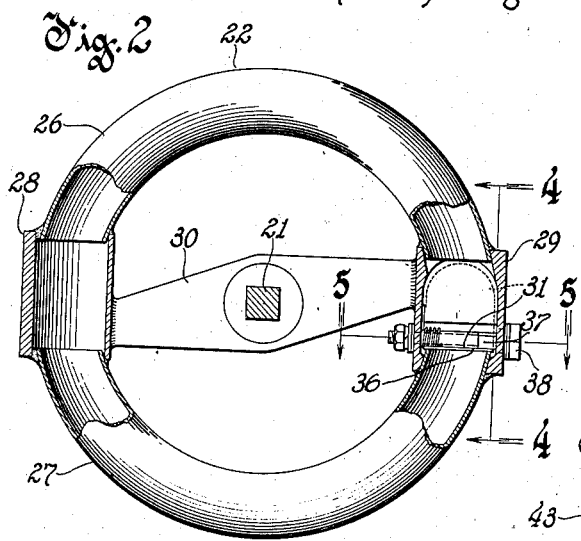
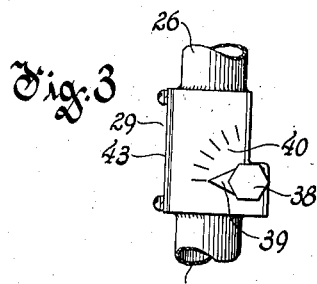
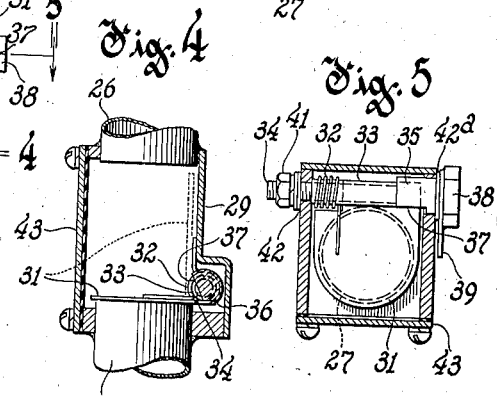
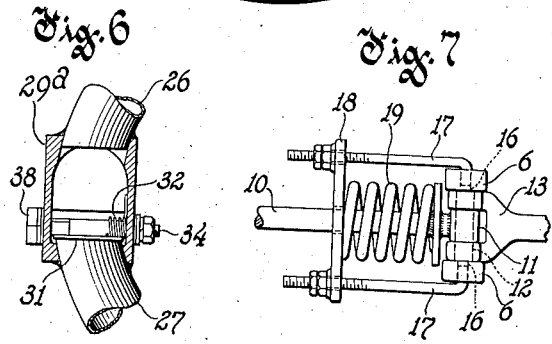
Inventor
Arvid E. Lillquist
By Frank H. Hubbard
Attorney Patented Sept. 30, 1941

2,257,611

UNITED STATES PATENT OFFICE 2,257,611

TIMING DEVICE FOR MECHANICAL POWER DRIVES

Arvid E. Lillquist, Milwaukee, Wis., assignor to Cutler-Hammer, Inc., Milwaukee, Wis., a corporation of Delaware Application August 16, 1939, Serial No. 290,524

9 Claims. (Cl. 188—171)

This invention relates to improvements in timing devices and while not limited thereto is particularly applicable to power driven mechanisms to vary the response thereof.

Certain power driven mechanisms employ a driving motor which when energized or deenergized is adapted to rotate a given number of revolutions or through a given degree of angular rotation to thereby actuate the mechanism from one operative position to another. It is frequently desired to increase the inherent inertia of the motor armature and thus, for example, to vary the time required by the motor to respond to the commutation of power supply thereto and thereby control the time cycle of the mechanism in either direction.

An object of the present invention is to provide means for varying the effective inertia of the rotating element of a motor to thereby vary the rate of its change in speed in response to a given torque applied thereto which tends to vary its speed.

Another object is to provide a fly-wheel the effective inertia of which is adjustable.

Another object is to provide means whereby the effective inertia of a rotating element is different for different directions of rotation.

Another object is to provide an inertia controlled timing mechanism the timing period of which may be varied by varying its effective inertia.

Another object is to provide a motor operated brake which may be applied and/or released with a time delay which may be varied by varying the effective inertia of the driving element of the motor.

Other objects and advantages will hereinafter appear.

Patent No. 2,127,335 granted August 16, 1938, to Howard E. Hodgson, for Power transmission mechanism for operating brakes, discloses a speed reducing driving mechanism for motor operated brake, and the present invention will be described and illustrated as applied to a mechanism of the aforementioned character, though it will be apparent that it is applicable to other uses. In the aforementioned brake mechanism it is often desirable to cause the brake to be released gradually or with a time delay following the energization of the motor which releases it, while providing for rapid setting of the brake, or to delay the application of the brake following the deenergization of said motor. The present invention affords an adjustment of the effective inertia of the motor when it is energized and/or deenergized to thereby vary the time delay in the actuation of said brake.

The accompanying drawing is illustrative of an embodiment of the invention in connection with a motor operated shoe brake.

In the drawing,

Figure 1 is a side view of a brake assembly transversely to the brake shaft,

Fig. 2 is a horizontal section through the flywheel along the lines 2—2 of Fig. 1, Figs. 3 to 6, inclusive, illustrate certain details of the time adjusting means employed in connection with the flywheel illustrated in Figs. 1 and 2, while Fig. 7 is a detail of certain brake biasing elements shown in Fig. 1.

Referring to Figs. 1 and 7, the driving mechanism is shown as applied to a brake having a brake drum 1 which is adapted to be secured to a shaft 2 of a machine which is to be controlled by the brake. The brake further includes brake shoes 3 and 4 adapted to frictionally engage the drum 1. The brake shoes 3 and 4 are pivotally supported by vertical brake levers 5 and 6 respectively, intermediate of the ends of the latter, while the lower ends of said levers are pivotally supported by pivots 7 and 8, respectively, on a base plate 9 for the brake. The upper end of lever 5 is provided with a guide hole to receive the threaded end of a pull rod 10, the other end of said rod being provided with an ear 11 which is pivotally connected by means of a pin 12 to the end of one arm of a bell crank lever 13. The lever 13 is pivotally supported by a pin 14 attached near the upper end of the lever 6. The end of the second arm 15 of bell crank lever 13 is adapted to engage the operating mechanism of the brake as will be explained hereinafter. The extreme upper end of lever 6 is forked so as to embrace the one arm of lever 13 and the ends of the fork members are provided with aligned transverse pivot holes 16 to receive the inwardly bent ends of pull rods 17, the other ends of which adjustably engage an abutment plate 18 which is concentric with the rod 10 and is adapted to slide freely thereon and which abuts one end of a compression spring 19, the other end of which spring abuts a collar which is fixed to the rod 10. Thus the spring 19 tends to move the brake shoes into frictional engagement with the drum to set the brake, at the same time tending to rotate the bell crank lever 13 clockwise, while the application of a force which rotates said bell crank lever counterclockwise releases the brake.

The driving mechanism for actuating the brake comprises a motor 20 which is mounted on the base 9 with its shaft 21 in a vertical position and in alignment with the end of the arm 15 of bell crank lever 13. The upper end of motor shaft 21 is provided with a square extension to which is fastened a variable inertia fly-wheel 22 and a sleeve nut 23, which latter engages a jack screw 24. The outer end of said jack screw 24 is provided with a forked extension 25 which engages the end of arm 15 of bell crank lever 13 and is restrained against rotation by the latter. Thus when the shaft of the motor is rotated in one or the other direction, the jack screw 24 is moved up or down to rotate bell crank lever 13 and thus actuate the brake. In order to effect setting of the brake, motor 20 is deenergized, whereupon spring 19 causes rotation of bell crank lever 13 in a clockwise direction, thus exerting a downward thrust against jack screw 24 which causes rotation of sleeve nut 23 and of the motor armature until the brake is set. When the brake is to be released, the motor is energized which causes rotation of sleeve nut 23 in the opposite direction, thereby raising the screw 24 and rotating bell crank lever 13 counterclockwise to release the brake shoes, the screw being provided with a suitable stop to limit its upward stroke, whereupon the motor armature is stalled while energized until the brake is released.

It is apparent that upon energization of the motor its armature requires some time to accelerate and rotate the sleeve nut 23 a sufficient number of turns to free the brake shoes from the drum, the time depending upon the effective inertia of the armature. Conversely when the motor is deenergized, its armature must be accelerated by spring 19 to rotate backwards to permit the screw 24 to descend into the sleeve nut 23. To make this inertia adjustable the fly-wheel 22 is mounted on the square extension of shaft 21 to rotate therewith.

Referring now to Figs. 2 to 5, inclusive, the fly wheel 22 comprises a hollow annular ring which preferably consists of two substantially semi-circular metal tubes 26 and 27 whose ends are joined by the chambers 28 and 29 to complete the ring. The chambers 28 and 29 are joined by a spider 30 which carries a central hub by which it is fastened to the shaft 21 to revolve therewith. As shown in Figs. 2, 4 and 5 the chamber 29 is provided with a pivoted valve disc 31 which is urged by a spring 32 into the position shown in full lines in Fig. 4 to thereby close the end of the tube 27.

The disc 31 is adapted to be moved against the bias of spring 32 to an open position as shown in dotted lines whereby it frees the opening in tube 27. Spring 32 is coiled around a pivot sleeve 33 to which is rigidly secured, as by welding, the valve disc 31. One end of spring 32 is arranged to engage disc 31, the other end thereof being arranged to engage the lower inner surface of chamber 29 (Figs. 2 and 4). Sleeve 33 is rotatably mounted upon a pivot shaft 34 which bears in alined openings provided in the opposite side walls of chamber 29. As best shown in Fig. 5 pivot shaft 34 is provided adjacent to its right hand end with a shouldered portion 35 of increased diameter. Said shouldered portion 35 is provided with a flat surface 36 as shown in Figs. 2 and 4 which provides an abutment for the rearwardly extending portion of disc 31 for limiting its counterclockwise rotation and a cut away surface 37 to permit clockwise rotation of the disc 31 to its open position (as shown in dotted lines in Fig. 4).

Pivot shaft 34 is provided at its right hand outer end with a polygonal head 38 to facilitate angular adjustment thereof as by means of a wrench. Thus by rotating shaft 34 clockwise (Fig. 4) the counterclockwise rotation of valve disc 31 may be limited and adjusted from the outside of the chamber 29 to thereby vary the degree of closure of the valve and thus the effective inertia of the fly wheel. The head 38 is preferably provided with a pointer 39 which registers with the markings on a scale 40 to indicate the limit of counterclockwise rotation and thus the maximum effective degree of opposition of valve disc 31 to the flow of fluid. Obviously suitable numerals or other indicia may be provided in connection with the scale 40 to afford a calibration of the effective inertia of the fly wheel in respect of time, for instance. The left hand outer end of pivot shaft 34 is threaded to receive a nut 41 which is adapted to frictionally and yieldably hold said pivot shaft in its adjusted position. Sealing washers or gaskets 42 and 42ª are preferably provided to closely fit the pivot shaft 34 and to be clamped against the outer surfaces respectively, of the side walls of chamber 29 upon tightening of the nut 41. The valve chamber 29 is provided with a cover plate 43 for ready access to its interior. The tube is filled with a fluid such as mercury.

The chamber 28 shown in Figs. 1 and 2 is employed as a filling chamber and is accordingly provided with an opening which is adapted to be closed by a plug 44. It is desired in some instances to provide for individual control of the effective inertia of the fly-wheel 22 for each direction of rotation thereof. A valve chamber substantially like valve chamber 29 is then employed in the place of chamber 28 as shown at 29ª in Fig. 6.

Let it be assumed that the motor rotates in a counterclockwise direction (with reference to Fig. 2) to release the brake and that the fly-wheel is provided with a valve in the chamber 29 only. As the motor armature starts to rotate, the fly-wheel rotates with it, but due to the inertia of the mercury the latter resists the rotative movement and exerts a pressure against the valve 31 to thereby press it tightly against abutment 36. Thus the flow of the fluid is retarded relative to the tube to a varying degree, depending upon the adjustment of abutment 36, whereby the retarding effect produces a pressure on the valve which is transmitted to the tube. This adds the effective inertia of the fluid to that of the tube and the rate of acceleration of the motor is thereby decreased and the release of the brake delayed.

Upon deenergization of the motor the spring 19 through bell crank lever 13 exerts a force on screw 24 to cause rotation of the shaft 21 and fly wheel 22 in a clockwise direction, thereby causing the mercury in the fly wheel to press against the valve 31 to open the same against the negligible bias of spring 32. This permits the mercury to circulate freely in the tube so that the effective inertia of the fly wheel is not increased by the inertia of the mercury and the acceleration time is accordingly shortened.

If a valve 29ª as aforedescribed, is also mounted in the tube the acceleration of the mechanism in the direction for setting the brake is also affected.

If the respective biasing spring 32 is made sufficiently heavy, the degree of torsional pressure exerted upon valve disc 31 may be adjusted by employing any suitable means to vary the normal position of the end of the spring opposed to that end which engages valve disc 31 to cause the valve to offer an adjustable resistance to the fluid in the direction tending to open the valve, to thereby provide for adjustment of the accelerating time.

When the motor has rotated to release the brake its energization is continued and the armature is stalled in the released position. It may be desirable in this case to cause setting of the brake, or it may also be desired to release it manually when the motor is deenergized. In these cases the fly-wheel 22 may be rotated manually in the proper direction to actuate the brake and upon release of the fly-wheel, the brake will return to the position corresponding to the condition of energization or deenergization of the motor.

It is obvious that the fly-wheel described may be applied to other uses where a variable inertia rotating motion is required.

What I claim as new and desire to secure by Letters Patent is:

1. The combination with a rotating shaft, of a fly-wheel connected therewith, said fly-wheel comprising a rim having an annular cavity, a valve adapted to restrict the circular flow of a fluid in said cavity induced by variations in speed of said fly-wheel, and biasing means to bias said valve to oppose by an adjustable amount the flow of said fluid resulting from such variations in speed.

2. The combination with a rotating shaft, of a fly-wheel connected therewith, said flywheel comprising a rim having an annular cavity, a valve adapted to restrict the circular flow of a fluid in said cavity induced by variations in speed of said fly-wheel, and biasing means to bias said valve to oppose by an adjustable amount the flow of said fluid resulting from such variations in speed in one direction of rotation and to prevent any relative circular flow in the other direction of rotation.

3. The combination with a rotating shaft, of a fly-wheel connected therewith, said fly-wheel comprising a rim having an annular cavity, a fluid substantially filling said cavity, means adjustable to impede to a preselected degree the relative rotation between said fluid and said rim upon an increase in speed of rotation of the latter in one direction, and other means independently adjustable to impede to a preselected degree the relative rotation between said fluid and said rim upon an increase in speed of rotation of the latter in the opposite direction.

4. The combination with a rotating shaft, of a fly-wheel connected therewith, said fly-wheel comprising a rim having an annular cavity, a valve adapted to restrict the circular flow of a fluid in said cavity induced by variations in speed of said fly-wheel, and means to adjust said valve to oppose to a preselected degree the flow of said fluid resulting from such variations in speed in one direction of rotation and to permit substantially free relative circular flow in the other direction of rotation.

5. The combination with a rotating shaft, of a fly-wheel connected therewith, said fly-wheel comprising a rim having an annular cavity, a fluid substantially filling said cavity, means adjustable to impede to a preselected degree the relative rotation between said fluid and said rim upon an increase in speed of rotation of the latter in one direction, and other means independently adjustable to impede to a preselected degree the relative rotation between said fluid and said rim upon an increase in speed of rotation of the latter in the opposite direction, the arrangement being such that each of said impeding means is rendered substantially ineffective when the other impeding means is rendered effective.

6. The combination with a brake, of a motor for controlling the operation of said brake, and means to vary the rate of engagement of said brake, comprising, a fly-wheel connected with the shaft of said motor, and having a hollow rim, a fluid in said rim, and means to control relative movement between said fluid and said rim.

7. The combination with a brake, of a motor for controlling the operation of said brake, and means to vary the rate of engagement of said brake, comprising, a fly-wheel connected to rotate with the motor and having a tubular rim, a fluid substantially filling the rim cavity, and means to control relative rotary movement between said fluid and said fly-wheel in one direction of rotation of the latter and to permit free relative rotary movement therebetween in the other direction of rotation of said fly-wheel.

8. The combination with a brake, of a motor for controlling the operation of said brake, and means to vary the rate of engagement of said brake, comprising, a fly-wheel connected to rotate with the motor and having a tubular rim, a fluid substantially filling said rim, means adjustable to impede to a preselected degree the relative rotation between said fluid and said rim upon an increase in speed of rotation of the latter in one direction, and other means independently adjustable to impede to a preselected degree the relative rotation between said fluid and said rim upon an increase in speed of rotation of the latter in the opposite direction.

9. The combination with a brake, of a motor for controlling the operation of said brake, and means to vary the rate of engagement of said brake, comprising, a fly-wheel connected to rotate with the motor and having a tubular rim, a fluid substantially filling said rim, means adjustable to impede to a preselected degree the relative rotation between said fluid and said rim upon an increase in speed of rotation of the latter in one direction, and other means independently adjustable to impede to a preselected degree the relative rotation between said fluid and said rim upon an increase in speed of rotation of the latter in the opposite direction, the arrangement being such that each of said impeding means is rendered substantially ineffective when the other impeding means is rendered effective.

ARVID E. LILLQUIST.